US012799321B2

(12) United States Patent
Matsuoka

(10) Patent No.: US 12,799,321 B2
(45) Date of Patent: Nov. 17, 2026

(54) RESIN COMPOSITION FOR INJECTION MOLDING AND INJECTION-MOLDED ARTICLE

(71) Applicant: KANEKA CORPORATION, Osaka (JP)

(72) Inventor: Yoshiaki Matsuoka, Settsu (JP)

(73) Assignee: KANEKA CORPORATION, Osaka (JP)

( * ) Notice: Subject to any disclaimer, the term of this patent is extended or adjusted under 35 U.S.C. 154(b) by 698 days.

(21) Appl. No.: 18/246,600

(22) PCT Filed: Sep. 16, 2021

(86) PCT No.: PCT/JP2021/034057
§ 371 (c)(1),
(2) Date: Mar. 24, 2023

(87) PCT Pub. No.: WO2022/065182
PCT Pub. Date: Mar. 31, 2022

(65) Prior Publication Data

US 2023/0365806 A1 Nov. 16, 2023

(30) Foreign Application Priority Data

Sep. 28, 2020 (JP) ................................ 2020-162612

(51) Int. Cl.
*C08L 67/04* (2006.01)
*B29C 45/00* (2006.01)
(Continued)

(52) U.S. Cl.
CPC .......... *C08L 67/04* (2013.01); *B29C 45/0001* (2013.01); *B29C 45/0013* (2013.01);
(Continued)

(58) Field of Classification Search
CPC . C08L 67/04; B29C 45/0001; B29C 45/0013; C08K 5/053; C08K 7/18;
(Continued)

(56) References Cited

U.S. PATENT DOCUMENTS

2010/0305280 A1* 12/2010 Whitehouse ............ C08L 67/04 525/450
2016/0251494 A1 9/2016 Koyama et al.

FOREIGN PATENT DOCUMENTS

WO WO 2015/052876 A1 4/2015

OTHER PUBLICATIONS

International Search Report mailed on Nov. 30, 2021 in PCT/JP2021/034057 filed on Sep. 16, 2021.

* cited by examiner

*Primary Examiner* — Shane Fang
(74) *Attorney, Agent, or Firm* — Oblon, McClelland, Maier & Neustadt, L.L.P.

(57) ABSTRACT

A resin composition contains a poly(3-hydroxyalkanoate) resin component, and the poly(3-hydroxyalkanoate) resin component includes a copolymer (A) which is a copolymer of 3-hydroxybutyrate units and other hydroxyalkanoate units and in which the content of the other hydroxyalkanoate units is from 1 to 6 mol % and a copolymer (B) which is a copolymer of 3-hydroxybutyrate units and other hydroxyalkanoate units and in which the content of the other hydroxyalkanoate units is 24 mol % or more. The resin composition further contains a layered clay mineral (C). The proportion of the copolymer (A) is from 72 to 93 wt %, and the proportion of the copolymer (B) is from 7 to 28 wt %. The amount of the layered clay mineral (C) is from 5 to 45 parts by weight per 100 parts by weight of the total poly(3-hydroxyalkanoate) resin component.

21 Claims, 1 Drawing Sheet

(51) Int. Cl.
*B29K 67/00* (2006.01)
*B29K 509/02* (2006.01)
*C08K 5/053* (2006.01)
*C08K 7/18* (2006.01)

(52) U.S. Cl.
CPC ................ *C08K 5/053* (2013.01); *C08K 7/18* (2013.01); *B29K 2067/04* (2013.01); *B29K 2509/02* (2013.01); *B29K 2995/006* (2013.01); *C08K 2201/005* (2013.01); *C08L 2201/06* (2013.01)

(58) Field of Classification Search
CPC .......... C08K 2201/005; C08K 2201/06; B29K 2067/04; B29K 2509/02; B29K 2995/006
See application file for complete search history.

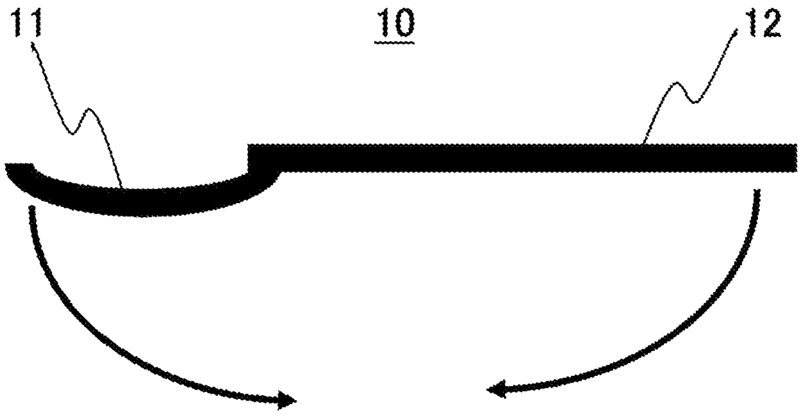
11
10
12

RESIN COMPOSITION FOR INJECTION MOLDING AND INJECTION-MOLDED ARTICLE

CROSS-REFERENCE TO RELATED APPLICATIONS

The present application is a 35 U.S.C. § 371 national stage patent application of International patent application PCT/JP2021/034057 filed on Sep. 16, 2021, which is based on and claims the benefits of priority to Japanese Application No. 2020-162612 filed on Sep. 28, 2020. The entire contents of all of the above applications are incorporated herein by reference.

TECHNICAL FIELD

The present invention relates to a resin composition for injection molding that contains a poly(3-hydroxyalkanoate) resin component and to an injection-molded article.

BACKGROUND ART

In recent years, environmental problems caused by waste plastics have become an issue of great concern. In particular, it has been found that a huge amount of plastics dumped at seas or carried into seas through rivers are drifting in the ocean on a global scale. Such plastics, which retain their shapes for a long period of time, are pointed out as having various harmful effects on the ecosystems, and examples of plastics-induced problems include: a phenomenon called ghost fishing where plastics catch or trap marine creatures; and eating disorder from which marine creatures having ingested plastics suffer due to the plastics remaining in their digestive organs.

There is also known a problematic phenomenon where plastics are broken into microplastic particles by the action of ultraviolet rays or any other cause, then the microplastic particles adsorb hazardous compounds present in the ocean, and marine creatures ingest the microplastic particles with the adsorbed compounds, so that hazardous substances are introduced into the food chain.

The use of biodegradable plastics is expected as means for addressing the plastics-induced marine pollution as described above. However, a report issued by the United Nations Environment Programme in 2015 states that plastics such as polylactic acid that can be biodegraded through composting are not expected to be degraded quickly in the actual ocean whose temperature is low and cannot therefore be used as a countermeasure against the marine pollution.

Under these circumstances, poly(3-hydroxyalkanoate) resins, which can be biodegraded even in seawater, are attracting attention as materials that can be a solution to the above problems.

Patent Literature 1 is directed to increasing the speed of crystallization of a poly(3-hydroxyalkanoate) resin and improving the surface smoothness and mold surface transferability of the resulting molded article, and discloses a resin composition containing a poly(3-hydroxyalkanoate) resin such as poly(3-hydroxybutyrate-co-3-hydroxyhexanoate), pentaerythritol, and a filler.

CITATION LIST

Patent Literature

PTL 1: WO 2015/052876

SUMMARY OF INVENTION

Technical Problem

For example, injection-molded articles such as spoons are often required to have a high level of balance between elastic modulus (stiffness) and toughness (resistance to break).

With the technique in which a filler is merely added to a poly(3-hydroxyalkanoate) resin as in Patent Literature 1, the resulting injection-molded article could have low toughness and be prone to break.

A possible approach to increasing the resistance to break is to add a soft biodegradable resin to a poly(3-hydroxyalkanoate) resin, and examples of the soft biodegradable resin include polybutylene succinate resins and polybutylene adipate terephthalate resins. However, the addition of such a soft biodegradable resin could reduce the seawater degradability or elastic modulus of the resulting injection-molded article or could lead to a long molding cycle and therefore low productivity.

There is a strong demand for an injection-molded article that has a practical level of balance between elastic modulus and toughness and is superior in terms of productivity despite being produced using a poly(3-hydroxyalkanoate) resin having seawater degradability as a main resin component.

In view of the above circumstances, the present invention aims to provide a resin composition that contains a poly(3-hydroxyalkanoate) resin component and from which an injection-molded article having a practical level of balance between elastic modulus and toughness can be formed with high productivity.

Solution to Problem

As a result of intensive studies with the goal of solving the above problem, the present inventors have found that an injection-molded article having a practical level of balance between elastic modulus and toughness can be formed with high productivity when two poly(3-hydroxyalkanoate) resins differing in the contents of constituent monomers are used in given proportions in conjunction with the addition of a given amount of a particular filler. Based on this finding, the inventors have completed the present invention.

Specifically, the present invention relates to a resin composition for injection molding, containing a poly(3-hydroxyalkanoate) resin component, wherein the poly(3-hydroxyalkanoate) resin component includes: a copolymer (A) which is a copolymer of 3-hydroxybutyrate units and other hydroxyalkanoate units and in which a content of the other hydroxyalkanoate units is from 1 to 6 mol %; and a copolymer (B) which is a copolymer of 3-hydroxybutyrate units and other hydroxyalkanoate units and in which a content of the other hydroxyalkanoate units is 24 mol % or more, the resin composition further contains a layered clay mineral (C), in the poly(3-hydroxyalkanoate) resin component, a proportion of the copolymer (A) is from 72 to 93 wt %, and a proportion of the copolymer (B) is from 7 to 28 wt %, and an amount of the layered clay mineral (C) is from 5 to 45 parts by weight per 100 parts by weight of the total poly(3-hydroxyalkanoate) resin component.

Preferably, an average content of the other hydroxyalkanoate units in total monomer units constituting the poly(3-hydroxyalkanoate) resin component is from 2 to 35 mol %.

Preferably, the other hydroxyalkanoate units are 3-hydroxyhexanoate units.

Preferably, the layered clay mineral (C) includes at least one selected from the group consisting of mica, talc, and kaolinite.

The present invention further relates to an injection-molded article including the resin composition for injection molding.

Advantageous Effects of Invention

The present invention can provide a resin composition that contains a poly(3-hydroxyalkanoate) resin component and from which an injection-molded article having a practical level of balance between elastic modulus and toughness can be formed with high productivity.

BRIEF DESCRIPTION OF DRAWINGS

FIGURE illustrates a bending test conducted for injection-molded articles (spoons) in Examples and Comparative Examples.

DESCRIPTION OF EMBODIMENTS

Hereinafter, embodiments of the present invention will be described. The present invention is not limited to the embodiments described below.

One embodiment of the present invention is a resin composition used in injection molding to produce a molded article. The resin composition contains at least a poly(3-hydroxyalkanoate) resin component as a resin component.

(Poly(3-hydroxyalkanoate) Resin Component)

The poly(3-hydroxyalkanoate) resin component used is a mixture of at least two poly(3-hydroxyalkanoate) resins differing in the contents of constituent monomers. With the use of the mixture, an injection-molded article having a practical level of balance between elastic modulus and toughness can be formed with high productivity.

Each of the poly(3-hydroxyalkanoate) resins is preferably a polymer containing 3-hydroxyalkanoate units, in particular a polymer containing units represented by the following formula (1).

$$[\text{—CHR—CH}_2\text{—CO—O—}] \quad (1)$$

In the formula (1), R is an alkyl group represented by $C_pH_{2p+1}$, and p is an integer from 1 to 15. Examples of the R group include linear or branched alkyl groups such as methyl, ethyl, propyl, methylpropyl, butyl, isobutyl, t-butyl, pentyl, and hexyl groups. The integer p is preferably from 1 to 10 and more preferably from 1 to 8.

Each of the poly(3-hydroxyalkanoate) resins is particularly preferably a microbially produced poly(3-hydroxyalkanoate) resin. In the microbially produced poly(3-hydroxyalkanoate) resin, all of the 3-hydroxyalkanoate units are contained as (R)-3-hydroxyalkanoate units.

Each of the poly(3-hydroxyalkanoate) resins preferably contains 50 mol % or more of 3-hydroxyalkanoate units (in particular, the units represented by the formula (1)) in the total structural units, and the content of the 3-hydroxyalkanoate units is more preferably 60 mol % or more and even more preferably 70 mol % or more. Each of the poly(3-hydroxyalkanoate) resins may contain only one type or two or more types of 3-hydroxyalkanoate units as polymer structural units or may contain other units (such as 4-hydroxyalkanoate units) in addition to the one type or two or more types of 3-hydroxyalkanoate units.

Each of the poly(3-hydroxyalkanoate) resins may be a homopolymer or copolymer containing 3-hydroxybutyrate (hereinafter also referred to as "3HB") units. In particular, all of the 3-hydroxybutyrate units are preferably (R)-3-hydroxybutyrate units. Each of the poly(3-hydroxyalkanoate) resins is preferably a copolymer of 3-hydroxybutyrate units and other hydroxyalkanoate units.

Specific examples of the poly(3-hydroxyalkanoate) resins include poly(3-hydroxybutyrate), poly(3-hydroxybutyrate-co-3-hydroxypropionate), poly(3-hydroxybutyrate-co-3-hydroxyvalerate) abbreviated as "P3HB3HV", poly(3-hydroxybutyrate-co-3-hydroxyvalerate-3-hydroxyhexanoate), poly(3-hydroxybutyrate-co-3-hydroxyhexanoate) abbreviated as "P3HB3HH", poly(3-hydroxybutyrate-co-3-hydroxyheptanoate), poly(3-hydroxybutyrate-co-3-hydroxyoctanoate), poly(3-hydroxybutyrate-co-3-hydroxynonanoate), poly(3-hydroxybutyrate-co-3-hydroxydecanoate), poly(3-hydroxybutyrate-co-3-hydroxyundecanoate), and poly(3-hydroxybutyrate-co-4-hydroxybutyrate) abbreviated as "P3HB4HB". In particular, poly(3-hydroxybutyrate-co-3-hydroxyhexanoate) and poly (3-hydroxybutyrate-co-4-hydroxybutyrate) are preferred in terms of factors such as the injection-molded article productivity and the mechanical properties of the injection-molded article, and poly(3-hydroxybutyrate-co-3-hydroxyhexanoate) is more preferred.

The poly(3-hydroxyalkanoate) resin component contains at least one high-crystallinity poly(3-hydroxyalkanoate) resin and at least one low-crystallinity poly(3-hydroxyalkanoate) resin. In general, high-crystallinity poly(3-hydroxyalkanoate) resins are superior in terms of productivity but have low mechanical strength, while low-crystallinity poly(3-hydroxyalkanoate) resins have good mechanical properties although being inferior in terms of productivity. Mixing of a high-crystallinity poly(3-hydroxyalkanoate) resin and a low-crystallinity poly(3-hydroxyalkanoate) resin is expected to lead to the result that the high-crystallinity poly(3-hydroxyalkanoate) resin forms fine resin crystal grains and the low-crystallinity poly(3-hydroxyalkanoate) resin forms tie molecules that crosslink the resin crystal grains to one another. The combined use of these resins can provide a marked improvement in the mechanical properties of the injection-molded article while ensuring high productivity.

The high-crystallinity poly(3-hydroxyalkanoate) resin is a copolymer (A) of 3-hydroxybutyrate units and other hydroxyalkanoate units. The content of the 3-hydroxybutyrate units in the high-crystallinity poly(3-hydroxyalkanoate) resin is preferably higher than the average content of 3-hydroxybutyrate units in total monomer units constituting the poly(3-hydroxyalkanoate) resin component. Specifically, the content of the other hydroxyalkanoate units in the copolymer (A) is preferably from 1 to 6 mol %, more preferably from 2 to 5 mol %, and even more preferably from 3 to 5 mol %.

The copolymer (A) used can be any of the above-mentioned copolymers containing 3-hydroxybutyrate units. The copolymer (A) is preferably poly(3-hydroxybutyrate-co-3-hydroxyhexanoate) or poly(3-hydroxybutyrate-co-4-hydroxybutyrate) and more preferably poly(3-hydroxybutyrate-co-3-hydroxyhexanoate).

The low-crystallinity poly(3-hydroxyalkanoate) resin is a copolymer (B) of 3-hydroxybutyrate units and other hydroxyalkanoate units. The content of the 3-hydroxybutyrate units in the low-crystallinity poly(3-hydroxyalkanoate) resin is preferably lower than the average content of 3-hydroxybutyrate units in total monomer units constituting the poly(3-hydroxyalkanoate) resin component. Specifically, the content of the other hydroxyalkanoate units in the copolymer (B) is preferably from 24 to 99 mol %, more preferably from 24 to 50 mol %, even more preferably from 24 to 35 mol %, and particularly preferably from 24 to 30 mol %.

The copolymer (B) used can be any of the above-mentioned copolymers containing 3-hydroxybutyrate units. The copolymer (B) is preferably poly(3-hydroxybutyrate-co-3-hydroxyhexanoate) or poly(3-hydroxybutyrate-co-4-hydroxybutyrate) and more preferably poly(3-hydroxybutyrate-co-3-hydroxyhexanoate).

The proportion of the copolymer (A) to the total amount of the copolymers (A) and (B) is from 72 to 93 wt %, and the proportion of the copolymer (B) to the total amount of the copolymers (A) and (B) is from 7 to 28 wt %. Using the copolymers (A) and (B) together in these proportions makes it possible to form an injection-molded article having a good balance between elastic modulus and toughness with high productivity. If the proportion of the copolymer (B), which is a low-crystallinity poly(3-hydroxyalkanoate) resin, is less than 7 wt %, the toughness of the injection-molded article tends to be insufficient. If the proportion of the copolymer (B) is more than 28 wt %, the molding cycle for forming the injection-molded article tends to lengthen, and the productivity tends to decrease. Preferably, the proportion of the copolymer (A) is from 75 to 90 wt %, and the proportion of the copolymer (B) is from 10 to 25 wt %. More preferably, the proportion of the copolymer (A) is from 77 to 88 wt %, and the proportion of the copolymer (B) is from 12 to 23 wt %. Even more preferably, the proportion of the copolymer (A) is from 75 to 85 wt %, and the proportion of the copolymer (B) is from 15 to 25 wt %.

The poly(3-hydroxyalkanoate) resin component may contain only the copolymers (A) and (B) or may further contain another poly(3-hydroxyalkanoate) resin in addition to the copolymers (A) and (B). The other poly(3-hydroxyalkanoate) resin may be a homopolymer of 3-hydroxybutyrate or may be a copolymer which is a copolymer of 3-hydroxybutyrate units and other hydroxyalkanoates and in which the content of the other hydroxyalkanoate units is outside the ranges as defined for the copolymers (A) and (B).

The average content ratio between 3-hydroxybutyrate units and other hydroxyalkanoate units (3-hydroxybutyrate units/other hydroxyalkanoate units) in total monomer units constituting the poly(3-hydroxyalkanoate) resin component is preferably from 98/2 to 65/35 (mol %/mol %), more preferably from 96/4 to 75/25 (mol %/mol %), even more preferably from 95/5 to 80/20 (mol %/mol %), and particularly preferably from 96/6 to 85/15 (mol %/mol %) in terms of ensuring both the mechanical properties of the injection-molded article and the injection-molded article productivity.

The average content ratio between different monomer units in total monomer units constituting the poly(3-hydroxyalkanoate) resin component can be determined by a method known to those skilled in the art, such as by a method described in paragraph [0047] of WO 2013/147139. The "average content ratio" refers to a molar ratio between different monomer units in total monomer units of the poly(3-hydroxyalkanoate) resin component and particularly refers to a molar ratio between different monomer units contained in the total mixture of the two or more poly(3-hydroxyalkanoate) resins constituting the poly(3-hydroxyalkanoate) resin component.

The weight-average molecular weight of the poly(3-hydroxyalkanoate) resin component is not limited to a particular range, but is preferably from $5\times10^4$ to $300\times10^4$, more preferably from $20\times10^4$ to $200\times10^4$, even more preferably from $25\times10^4$ to $150\times10^4$, and particularly preferably from $30\times10^4$ to $80\times10^4$ in terms of ensuring both the mechanical properties of the injection-molded article and the injection-molded article productivity.

The weight-average molecular weight of each of the poly(3-hydroxyalkanoate) resins constituting the poly(3-hydroxyalkanoate) resin component is not limited to a particular range. In terms of ensuring both the mechanical properties of the injection-molded article and the injection-molded article productivity, the weight-average molecular weight of the copolymer (A), which is a high-crystallinity poly(3-hydroxyalkanoate) resin, is preferably from $20\times10^4$ to $100\times10^4$, more preferably from $22\times10^4$ to $80\times10^4$, and even more preferably from $25\times10^4$ to $60\times10^4$. In terms of ensuring both the mechanical properties of the injection-molded article and the injection-molded article productivity, the weight-average molecular weight of the copolymer (B), which is a low-crystallinity poly(3-hydroxyalkanoate) resin, is preferably from $20\times10^4$ to $250\times10^4$, more preferably from $25\times10^4$ to $230\times10^4$, even more preferably from $30\times10^4$ to $200\times10^4$, and particularly preferably from $35\times10^4$ to $150\times10^4$.

The weight-average molecular weight of each poly(3-hydroxyalkanoate) resin or the poly(3-hydroxyalkanoate) resin component can be measured as a polystyrene-equivalent molecular weight by gel permeation chromatography (HPLC GPC system manufactured by Shimadzu Corporation) using a chloroform solvent. The column used in the gel permeation chromatography may be any column suitable for weight-average molecular weight measurement.

The poly(3-hydroxyalkanoate) resin component is preferably one that has not been crosslinked by the use of a crosslinking agent such as an organic peroxide. That is, the poly(3-hydroxyalkanoate) resin component is preferably a resin component having no crosslinked structure.

The method for producing each of the poly(3-hydroxyalkanoate) resins is not limited to a particular technique, and may be a chemical synthesis production method or a microbial production method. A microbial production method is more preferred. The microbial production method used can be any known method. Known examples of bacteria that produce copolymers of 3-hydroxybutyrate with other hydroxyalkanoates include *Aeromonas caviae* which is a P3HB3HV- and P3HB3HH-producing bacterium and *Alcaligenes eutrophus* which is a P3HB4HB-producing bacterium. In particular, in order to increase the P3HB3HH productivity, *Alcaligenes eutrophus* AC32 (FERM BP-6038; see T. Fukui, Y Doi, *J. Bacteriol.,* 179, pp. 4821-4830 (1997)) having a P3HA synthase gene introduced is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable poly(3-hydroxyalkanoate) resin synthesis-related gene introduced may be used depending on the poly(3-hydroxyalkanoate) resin to be produced. The culture conditions including the type of the substrate may be optimized depending on the poly(3-hydroxyalkanoate) resin to be produced.

The method for obtaining a blend of two or more poly(3-hydroxyalkanoate) resins is not limited to a particular technique. The blend may be obtained by microbial production or chemical synthesis. Alternatively, the blend may be obtained by melting and kneading the two or more resins using a device such as an extruder, a kneader, a Banbury mixer, or a roll mill or by dissolving and mixing the two or more resins in a solvent and drying the resulting mixture.

(Additional Resin)

The resin composition for injection molding according to one embodiment may contain an additional resin in addition to the poly(3-hydroxyalkanoate) resins to the extent that the additional resin does not impair the effect of the present invention. Examples of the additional resin include: aliphatic polyester resins such as polybutylene succinate adipate, polybutylene succinate, polycaprolactone, and polylactic acid; and aliphatic-aromatic polyester resins such as polybutylene adipate terephthalate, polybutylene sebacate terephthalate, and polybutylene azelate terephthalate. The resin composition may contain one additional resin or two or more additional resins.

The amount of the additional resin is not limited to a particular range, but is preferably 20 parts by weight or less, more preferably 10 parts by weight or less, and even more preferably 5 parts by weight or less per 100 parts by weight of the total poly(3-hydroxyalkanoate) resin component in terms of the seawater degradability of the injection-molded article. The lower limit of the amount of the additional resin is not limited to a particular value and may be 0 part by weight.

(Layered Clay Mineral (C))

The resin composition for injection molding according to one embodiment further contains a layered clay mineral (C). Thus, the resin composition can be formed into an injection-molded article having a good balance between elastic modulus and toughness. The "layered clay mineral" refers to a mineral whose main component is a sheet silicate.

The layered clay mineral (C) is not limited to a particular type, and any known layered clay mineral can be used. In order to reliably achieve the productivity-improving effect, the layered clay mineral (C) preferably includes at least one selected from the group consisting of smectite, mica, talc, pyrophyllite, vermiculite, chlorite, kaolinite, and serpentine. In terms of usability, mica, talc, and kaolinite are preferred, and talc is particularly preferred.

Examples of the mica include wet-ground mica and dry-ground mica, specific examples of which include mica manufactured by Yamaguchi Mica Co., Ltd. or Keiwa Rozai Co., Ltd.

Examples of the talc include general-purpose talc and surface-treated talc, specific examples of which include "MICRO ACE™" manufactured by Nippon Talc Co., Ltd., "Talcum Powder™" manufactured by Hayashi Kasei Co., Ltd., and talc manufactured by Takehara Kagaku Kogyo Co., Ltd. or Maruo Calcium Co., Ltd.

Examples of the kaolinite include dry kaolin, calcined kaolin, and wet kaolin, specific examples of which include "TRANSLINK™", ASP™, "SANTINTONE™", and "ULTREX™" manufactured by Hayashi Kasei Co., Ltd. and kaolinite manufactured by Keiwa Rozai Co., Ltd.

The average particle size of the layered clay mineral (C) is preferably from 0.1 to 50 μm, more preferably from 0.3 to 30 μm, even more preferably from 0.5 to 15 μm, and particularly preferably from 1 to 10 μm in order to ensure good mechanical properties of the injection-molded article and high productivity. The average particle size can be measured using a laser diffraction/scattering particle size analyzer such as "Microtrac MT3100II" manufactured by Nikkiso Co., Ltd.

The amount of the layered clay mineral (C) is from 5 to 45 parts by weight per 100 parts by weight of the total poly(3-hydroxyalkanoate) resin component. The addition of this amount of layered clay mineral (C) makes it possible to form an injection-molded article having a good balance between elastic modulus and toughness with high productivity. If the amount of the layered clay mineral (C) is less than 5 parts by weight, the elastic modulus of the injection-molded article tends to decrease. If the amount of the layered clay mineral (C) is more than 45 parts by weight, the production of the injection-molded article is difficult. The amount of the layered clay mineral (C) is preferably from 10 to 40 parts by weight, more preferably from 10 to 35 parts by weight, and even more preferably from 15 to 30 parts by weight.

The layered clay mineral (C) is preferably used together with a dispersion aid in order to increase the dispersibility of the layered clay mineral (C).

Examples of the dispersion aid include glycerin ester compounds, adipic ester compounds, polyether ester compounds, phthalic ester compounds, isosorbide ester compounds, and polycaprolactone compounds. Among these, the following compounds are preferred because they have high affinity for the resin component and are less likely to cause bleed-out: modified glycerin compounds such as glycerin diacetomonolaurate, glycerin diacetomonocaprylate, and glycerin diacetomonodecanoate; adipic ester compounds such as diethylhexyl adipate, dioctyl adipate, and diisononyl adipate; and polyether ester compounds such as polyethylene glycol dibenzoate, polyethylene glycol dicaprylate, and polyethylene glycol diisostearate. Dispersion aids containing a large amount of biomass-derived component are particularly preferred in order to increase the overall biomass degree of the resulting composition. Examples of such dispersion aids include RIKEMAL™ PL series of Riken Vitamin Co., Ltd. and Polysorb series of Roquette Freres. One dispersion aid may be used alone, or two or more dispersion aids may be used in combination.

The (total) amount of the dispersion aid(s) is not limited to a particular range, but is preferably from 0.1 to 20 parts by weight per 100 parts by weight of the total poly(3-hydroxyalkanoate) resin component. The dispersion aid(s) need not be added.

(Additives)

The resin composition for injection molding according to one embodiment may contain additives to the extent that the additives do not impair the effect of the present invention. Examples of the additives include a nucleating agent, a lubricant, a plasticizer, an antistatic, a flame retardant, a conductive additive, a heat insulator, a crosslinking agent, an antioxidant, an ultraviolet absorber, a colorant, an inorganic filler, an organic filler, and a hydrolysis inhibitor, and these additives can be used depending on the intended purpose. Biodegradable additives are particularly preferred.

Examples of the nucleating agent include pentaerythritol, orotic acid, aspartame, cyanuric acid, glycine, zinc phenylphosphonate, and boron nitride. Among these, pentaerythritol is preferred because it is particularly superior in the accelerating effect on crystallization of the poly(3-hydroxyalkanoate) resin component. The amount of the nucleating agent used is not limited to a particular range, but is preferably from 0.1 to 5 parts by weight, more preferably from 0.5 to 3 parts by weight, and even more preferably from 0.7 to 1.5 parts by weight per 100 parts by weight of the total poly(3-hydroxyalkanoate) resin component. One nucleating agent may be used alone, or two or more nucleating agents may be used. The proportions of the nucleating agents used can be adjusted as appropriate depending on the intended purpose.

Examples of the lubricant include behenamide, oleamide, erucamide, stearamide, palmitamide, N-stearyl behenamide, N-stearyl erucamide, ethylenebisstearamide, ethylenebisoleamide, ethylenebiserucamide, ethylenebislauramide, ethylenebiscapramide, p-phenylenebisstearamide, and a polycondensation product of ethylenediamine, stearic acid, and sebacic acid. Among these, behenamide and erucamide are preferred because they are particularly superior in the lubricating effect on the poly(3-hydroxyalkanoate) resin component. The amount of the lubricant used is not limited to a particular range, but is preferably from 0.01 to 5 parts by weight, more preferably from 0.05 to 3 parts by weight, and even more preferably from 0.1 to 1.5 parts by weight per 100 parts by weight of the total poly(3-hydroxyalkanoate) resin component. One lubricant may be used alone, or two or more lubricants may be used. The proportions of the lubricants used can be adjusted as appropriate depending on the intended purpose.

Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred because they are particularly superior in the plasticizing effect on the poly(3-hydroxyalkanoate) resin component. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate. The amount of the plasticizer used is not limited to a particular range, but is preferably from 1 to 20 parts by weight, more preferably from 2 to 15 parts by weight, and even more preferably from 3 to 10 parts by weight per 100 parts by weight of the total poly(3-hydroxyalkanoate) resin component. One plasticizer may be used alone, or two or more plasticizers may be used. The proportions of the plasticizers used can be adjusted as appropriate depending on the intended purpose.

(Method for Producing Injection-Molded Article)

An injection-molded article according to one embodiment can be produced by melting and kneading the components, processing the kneaded mixture into pellets as necessary, and subjecting the pellets to a known injection molding process. The details of the production of the injection-molded article will be described hereinafter.

First, the poly(3-hydroxyalkanoate) resin component and the layered clay mineral (C) are melted and kneaded, together with an additional resin and additives added as necessary, by using a device such as an extruder, a kneader, a Banbury mixer, or a roll mill, and thus a resin composition is prepared. The resin composition is extruded into a strand, which is then cut to obtain pellets in the form of cylindrical, elliptic cylindrical, spherical, cubic, or rectangular parallelepiped-shaped particles. Desirably, the pellets thus made are thoroughly dried at 40 to 80° C. to remove water before they are subjected to injection molding.

The temperature for the melting and kneading depends on the properties such as melting point and melt viscosity of the resins used and cannot be definitely specified. The resin temperature of the melted kneaded product at the die outlet is preferably from 135 to 200° C., more preferably from 140 to 195° C., even more preferably from 145 to 190° C., and particularly preferably from 150 to 185° C. If the resin temperature of the melted kneaded product is lower than 135° C., the poly(3-hydroxyalkanoate) resin component could remain unmelted. If the resin temperature is higher than 200° C., the poly(3-hydroxyalkanoate) resin component could be thermally decomposed.

Next, the pellets made as above are subjected to injection molding. Thus, an injection-molded article can be formed. The injection molding is a process in which a resin composition heated and melted is injected into a mold and cooled and solidified in the mold and subsequently the mold is opened to release the molded article from the mold. The injection molding process used can be any injection molding process commonly used for molding of thermoplastic resins. Other examples include injection blow molding, gas-assisted injection molding, and injection compression molding. In-mold injection molding, gas pressure injection molding, double molding, sandwich molding, push-pull injection molding, or SCORIM can also be used. Usable injection molding processes are not limited to those mentioned above.

The temperature for the post-injection cooling in the mold can be set as appropriate by those skilled in the art. The temperature for the post-injection cooling is preferably, for example, from 20 to 70° C., more preferably from 25 to 60° C., even more preferably from 30 to 50° C., and particularly preferably from 35 to 45° C.

The injection-molded article according to a preferred embodiment has high seawater degradability since the resin component is mainly composed of poly(3-hydroxyalkanoate) resins. Thus, the injection-molded article can be a solution to environmental problems caused by sea dumping of plastics.

The use of the injection-molded article according to one embodiment is not limited to a particular product, and exemplary products include: dinnerware such as dishes, drinking cups, other cups, lids, and trays; cutlery such as spoons, forks, knives, and muddlers; capsules such as coffee capsules and toy capsules; toy products; materials for agriculture; parts of OA equipment; parts of home electric appliances; parts of automobiles; various kinds of containers and boxes; daily sundries; stationery products; and bottles.

EXAMPLES

Hereinafter, the present invention will be specifically described using examples. The technical scope of the present invention is not limited by the examples given below.

The following lists the materials used in Examples and Comparative Examples.

[Poly(3-hydroxyalkanoate) Resins]

PHBH 1: P3HB3HH (average content ratio 3HB/3HH=95.4/4.6 (mol %/mol %), weight-average molecular weight=$38\times10^4$ g/mol)

This resin was produced according to a method as described in Example 2 of WO 2019/142845.

PHBH 2: P3HB3HH (average content ratio 3HB/3HH=71.8/28.2 (mol %/mol %), weight-average molecular weight=$66\times10^4$ g/mol)

This resin was produced according to a method as described in Example 9 of WO 2019/142845.

PBSA: Polybutylene succinate adipate resin, BioPBS FD72PB manufactured by Mitsubishi Chemical Corporation PBAT: Polybutylene adipate terephthalate, Ecoflex F Blend C1200 manufactured by BASF

[Layered Clay Mineral (C)]

Talc: MICRO ACE K-1 (Nippon Talc Co., Ltd.)

[Additives]

Additive-1: Pentaerythritol (Neulizer P manufactured by Mitsubishi Chemical Corporation)

Additive-2: Behenamide (BNT-22H manufactured by Nippon Fine Chemical Co., Ltd.)

The following describes methods used for evaluation in Examples and Comparative Examples.

[Evaluation of Tensile Modulus]

(Preparation of Test Specimens)

Resin pellets dried by a dehumidification drier at 60° C. for 24 hours were processed using Si-30V, an injection molding machine manufactured by Toyo Machinery & Metal Co., Ltd. The barrel temperature of the injection molding machine was set to nozzle/T1/T2/T3=155/145/135/125° C., the mold temperature was set to 35° C., and the injection rate was set to 20 mm/sec. By this injection molding, 4-mm-thick type 1A dumbbell-shaped specimens as specified in JIS K 7161 were obtained.

(Measurement of Elastic Modulus)

The obtained dumbbell-shaped specimens were allowed to stand at 23° C. for 168 hours, after which the tensile modulus of each specimen was measured by a tensile test performed at 10 mm/sec according to JIS K 7161. A score of "Good" (satisfactory tensile modulus) was given when the measured tensile modulus was 1400 MPa or more, while a score of "Poor" (unsatisfactory tensile modulus) was given when the measured tensile modulus was less than 1400 MPa.

[Bending Test]

(Preparation of Test Specimens)

Resin pellets dried by a dehumidification drier at 60° C. for 24 hours were processed using Si-30V, an injection molding machine manufactured by Toyo Machinery & Metal Co., Ltd. The barrel temperature of the injection molding machine was set to nozzle/T1/T2/T3=155/145/135/125° C., the mold temperature was set to 35° C., and the injection rate was set to 20 mm/sec. By this injection molding, small dessert spoons having a length of 9.8 cm, a bowl thickness of 1 mm, and a handle thickness of 1.5 mm were obtained.

(Evaluation of Bending)

A bending test was conducted, in which a human tester held the end of a bowl 11 of a spoon 10 by the left hand and the end of a handle 12 of the spoon 10 by the right hand and bent the spoon 10 vigorously in the direction indicated by arrows in FIGURE. Five spoons were subjected to the same bending test. A score of "Good" (satisfactory toughness) was given when none of the five spoons were broken, while a score of "Poor" (unsatisfactory toughness) was given when at least one of the five spoons was broken.

[Evaluation of Molding Cycle]

Resin pellets dried by a dehumidification drier at 60° C. for 24 hours were processed using Si-30V, an injection molding machine manufactured by Toyo Machinery & Metal Co., Ltd. The barrel temperature of the injection molding machine was set to nozzle/T1/T2/T3=155/145/135/125° C., the mold temperature was set to 35° C., and the injection rate was set to 20 mm/sec. By this injection molding, coffee capsules were obtained. A score of "Good" (satisfactory productivity) was given when the molding cycle required less than 30 seconds, while a score of "Poor" (unsatisfactory productivity) was given when the molding cycle required 30 seconds or more.

[Evaluation of Seawater Degradability]

(Preparation of Test Specimens)

Pellets dried by a dehumidification drier at 60° C. for 24 hours were used. Labo Plastomill 3S150 manufactured by Toyo Seiki Seisaku-sho, Ltd. was used in combination with a single-screw extruder "D2020", a T-die "T150C" (lip thickness=250 μm, lip width=15 cm), and a film haul-off unit "FT2W20" (roll temperature=30° C., haul-off speed=2 m), and the molding temperature conditions were set to C1/C2/C3/die=130/140/150/160° C. By this molding process, 30-μm-thick films were obtained.

(Seawater Degradability Test)

After three or more consecutive days without rain, 10 L of seawater was obtained from the Seto Inland Sea neighboring the Takasago Manufacturing Site of Kaneka Corporation. The seawater was filtered though an 80-mesh filter, and 5 g of ammonium chloride and 1 g of potassium dihydrogen phosphate were added to the filtered seawater and thoroughly dissolved by stirring. The seawater thus prepared was poured into a container measuring 37 cm in height, 30 cm in width, and 52 cm in length such that the container was filled to 60% of its volume. Each of the films obtained as above was cut into a 10 cm×10 cm piece, which was immersed in the seawater and left for two months under air bubbling. A score of "Good" (satisfactory seawater degradability) was given when the film degraded and disappeared, while a score of "Poor" (unsatisfactory seawater degradability) was given when the film did not disappear.

Example 1

(Preparation of PHBH Blend)

The total amount of the copolymer (A), the copolymer (B), and another biodegradable resin was defined as 100 parts by weight (100 parts by weight=10 kg), and the components other than talc were mixed as per the mix proportions (parts by weight) shown in Table 2. Specifically, 9.0 kg of PHBH 1, 1.0 kg of PHBH 2, 100 g of Additive 1, and 50 g of Additive 2 were placed into 75L Super Mixer manufactured by Kawata Mfg. Co., Ltd. and were stirred at 300 rpm for 3 minutes to obtain a PHBH blend.

(Compounding)

TEM26SS (L/D=60) manufactured by Toshiba Machine Co., Ltd. was used. In this machine, screw configurations, accessory equipment, and barrel setting temperatures listed in Table 1 are employed, and the screw rotational speed was set to 100 rpm. The PHBH blend was fed by a main feeder from the base of the screw, and 1.0 kg of talc was added by a side feeder. The total feed rate of the main feed and the side feed was set to 10 kg/hr, and the main feed rate and the side feed rate were determined based on the following equations.

$$\text{Side feed rate} = 10\ \text{kg/hr} \times \text{parts by weight of talc} \div \text{total parts by weight of blend components}$$

$$\text{Main feed rate} = 10\ \text{kg/hr} - \text{side feed rate}$$

The strand coming out of the die end was passed through a water bath filled with 45° C. hot water to solidify the strand, which was then cut into pellets by a pelletizer.

The pellets obtained were subjected to the tensile modulus measurement, the bending test, and the molding cycle test. The results are summarized in Table 3.

Examples 2 to 16 and Comparative Examples 1 to 22

Pellets were obtained in the same manner as in Example 1, except that the PHBH blend preparation and the compounding were carried out as per the mix proportions shown in Table 2. The pellets obtained were subjected to the tensile modulus measurement, the bending test, and the molding cycle test. The results are summarized in Table 3.

In Examples 4 and 8 and Comparative Examples 21 and 22, the seawater degradability test was also conducted. The results are shown in Table 3.

TABLE 1

| Cylinder | Screw configuration | Accessory equipment | Barrel setting temperature (° C.) |
|---|---|---|---|
| Cylinder 1 | Full flight | Main feeder (base of screw) | Water cooling (20 ± 5) |
| Cylinder 2 | Full flight | | 140 |
| Cylinder 3 | Full flight | | 140 |
| Cylinder 4 | Full flight | | 140 |
| Cylinder 5 | Full flight | | 140 |
| Cylinder 6 | Full flight | | 140 |
| Cylinder 7 | Kneading | | 140 |
| Cylinder 8 | Kneading | | 140 |

TABLE 1-continued

| Cylinder | Screw configuration | Accessory equipment | Barrel setting temperature (° C.) |
|---|---|---|---|
| Cylinder 9 | Full flight | | 140 |
| Cylinder 10 | Full flight | Open vent | 140 |
| Cylinder 11 | Full flight | Side feeder | 140 |
| Cylinder 12 | Kneading | | 140 |
| Cylinder 13 | Full flight | | 140 |
| Cylinder 14 | Full flight | Open vent | 140 |
| Cylinder 15 | Full flight | | 140 |
| Die | | | 140 |

TABLE 2

| Mix proportions | | Examples | | | | | | | | | | | | | | | |
|---|---|---|---|---|---|---|---|---|---|---|---|---|---|---|---|---|---|
| (unit: parts by weight) | | 1 | 2 | 3 | 4 | 5 | 6 | 7 | 8 | 9 | 10 | 11 | 12 | 13 | 14 | 15 | 16 |
| Copolymer (A) | PHBH 1 | 90 | 85 | 80 | 75 | 90 | 85 | 80 | 75 | 90 | 85 | 80 | 75 | 90 | 85 | 80 | 75 |
| Copolymer (B) | PHBH 2 | 10 | 15 | 20 | 25 | 10 | 15 | 20 | 25 | 10 | 15 | 20 | 25 | 10 | 15 | 20 | 25 |
| Layered clay mineral (C) | Talc | 10 | 10 | 10 | 10 | 20 | 20 | 20 | 20 | 30 | 30 | 30 | 30 | 40 | 40 | 40 | 40 |
| Other biodegradable resins | PRSA | | | | | | | | | | | | | | | | |
| | PBAT | | | | | | | | | | | | | | | | |
| Additives | Additive 1 | 1 | 1 | 1 | 1 | 1 | 1 | 1 | 1 | 1 | 1 | 1 | 1 | 1 | 1 | 1 | 1 |
| | Additive 2 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

| Mix proportions | | Comparative Examples | | | | | | | | | | | |
|---|---|---|---|---|---|---|---|---|---|---|---|---|---|
| (unit: parts by weight) | | 1 | 2 | 3 | 4 | 5 | 6 | 7 | 8 | 9 | 10 | 11 | 12 |
| Copolymer (A) | PHBH 1 | 100 | 95 | 90 | 85 | 80 | 100 | 95 | 70 | 100 | 95 | 70 | 100 |
| Copolymer (B) | PHBH 2 | 0 | 5 | 10 | 15 | 20 | 0 | 5 | 30 | 0 | 5 | 30 | 0 |
| Layered clay mineral (C) | Talc | | | | | | 10 | 10 | 10 | 20 | 20 | 20 | 30 |
| Other biodegradable resins | PBSA | | | | | | | | | | | | |
| | PBAT | | | | | | | | | | | | |
| Addtives | Additive 1 | 1 | 1 | 1 | 1 | 1 | 1 | 1 | 1 | 1 | 1 | 1 | 1 |
| | Additive 2 | 0.5 | 0.5 | 0.5 | 0.5 | 0.5 | 0.5 | 0.5 | 0.5 | 0.5 | 0.5 | 0.5 | 0.5 |

| Mix proportions | | Comparative Examples | | | | | | | | | |
|---|---|---|---|---|---|---|---|---|---|---|---|
| (unit: parts by weight) | | 13 | 14 | 15 | 16 | 17 | 18 | 19 | 20 | 21 | 22 |
| Copolymer (A) | PHBH 1 | 95 | 70 | 95 | 70 | 90 | 85 | 80 | 75 | 75 | 75 |
| Copolymer (B) | PHBH 2 | 5 | 30 | 5 | 30 | 10 | 15 | 20 | 25 | | |
| Layered clay mineral (C) | Talc | 30 | 30 | 40 | 40 | 50 | 50 | 50 | 50 | 10 | 10 |
| Other biodegradable resins | PBSA | | | | | | | | | 25 | |
| | PBAT | | | | | | | | | | 25 |
| Addtives | Additive 1 | 1 | 1 | 1 | 1 | 1 | 1 | 1 | 1 | 1 | 1 |
| | Additive 2 | 0.5 | 0.5 | 0.5 | 0.5 | 0.5 | 0.5 | 0.5 | 0.5 | 0.5 | 0.5 |

TABLE 3

| No. of Example or Comp. Example<br>Tensile modulus<br>Bending test<br>Molding cycle<br>Seawater degradability test | | Amount of copolymer (B) (wt %) | | | | | | |
|---|---|---|---|---|---|---|---|---|
| | | 0 | 5 | 10 | 15 | 20 | 25 | 30 |
| Amount of talc (parts by weight) | 0 | Comp. Ex. 1<br>Good 1590<br>Poor<br>Good | Comp. Ex. 2<br>Good 1420<br>Poor<br>Good | Comp. Ex. 3<br>Poor 1360<br>Good<br>Good | Comp. Ex. 4<br>Poor 1250<br>Good<br>Good | Comp. Ex. 5<br>Poor 1110<br>Good<br>Good | | |
| | 10 | Comp. Ex 6<br>Good 1920<br>Poor<br>Good | Comp. Ex. 7<br>Good 1830<br>Poor<br>Good | Ex. 1<br>Good 1730<br>Good<br>Good | Ex. 2<br>Good 1620<br>Good<br>Good | Ex. 3<br>Good 1530<br>Good<br>Good | Ex. 4<br>Good 1440<br>Good<br>Good<br>Good | Comp. Ex. 8<br>Poor 1290<br>Good<br>Poor |

TABLE 3-continued

| No. of Example or Comp. Example<br>Tensile modulus<br>Bending test<br>Molding cycle<br>Seawater | Amount of copolymer (B) (wt %) | | | | | | |
|---|---|---|---|---|---|---|---|
| degradability test | 0 | 5 | 10 | 15 | 20 | 25 | 30 |
| 20 | Comp. Ex. 9<br>Good 2500<br>Poor<br>Good | Comp. Ex. 10<br>Good 2290<br>Poor<br>Good | Ex. 5<br>Good 2120<br>Good<br>Good | Ex. 6<br>Good 1970<br>Good<br>Good | Ex. 7<br>Good 1830<br>Good<br>Good | Ex. 8<br>Good 1690<br>Good<br>Good<br>Good | Comp. Ex. 11<br>Good 1510<br>Good<br>Poor |
| 30 | Comp. Ex. 12<br>Good 2730<br>Poor<br>Good | Comp. Ex. 13<br>Good 2510<br>Poor<br>Good | Ex. 9<br>Good 2320<br>Good<br>Good | Ex. 10<br>Good 2090<br>Good<br>Good | Ex. 11<br>Good 1920<br>Good<br>Good | Ex. 12<br>Good 1810<br>Good<br>Good | Comp. Ex. 14<br>Good 1690<br>Good<br>Poor |
| 40 | | Comp. Ex. 15<br>Good 2700<br>Poor<br>Good | Ex. 13<br>Good 2490<br>Good<br>Good | Ex. 14<br>Good 2230<br>Good<br>Good | Ex. 15<br>Good 2090<br>Good<br>Good | Ex. 16<br>Good 1930<br>Good<br>Good | Comp. Ex. 16<br>Good 1800<br>Good<br>Poor |
| | | | Comp. Ex. 17<br>Pelletization<br>was infeasible | Comp. Ex. 18<br>Pelletization<br>was infeasible | Comp. Ex. 19<br>Pelletization<br>was infeasible | Comp. Ex. 20<br>Pelletization<br>was infeasible | |
| | | | Comp. Ex. 21<br>(PBSA was contained)<br>Poor 1380<br>Good<br>Good<br>Seawater degradability Poor | | Comp. Ex. 22<br>(PBAT was contained)<br>Poor 1320<br>Good<br>Good<br>Seawater degradability Poor | | |

For the injection-molded articles obtained in Examples 1 to 16, Table 3 reveals that both the tensile modulus and the toughness exhibited in the bending test were satisfactory and that the molding cycle was short and the productivity was high.

In contrast, for all of the injection-molded articles obtained in Comparative Examples 1, 2, 6, 7, 9, 10, 12, 13, and 15 where the content of the copolymer (B) was less than 7 wt %, the toughness was unsatisfactory. For all of the injection-molded articles obtained in Comparative Examples 8, 11, 14, and 16 where the content of the copolymer (B) was more than 28 wt %, the molding cycle was long, and the productivity was unsatisfactory.

For all of the injection-molded articles obtained in Comparative Examples 3 to 5 where the content of the copolymer (B) was in the range of 7 to 28 wt % but talc was not contained, the tensile modulus was unsatisfactory. In all of Comparative Examples 17 to 20 where the amount of talc was more than 45 parts by weight, pelletization was infeasible and any injection-molded article was not able to be produced.

For all of the injection-molded articles obtained in Comparative Examples 21 and 22 where the copolymer (B) was not contained but instead another biodegradable resin was contained, the tensile modulus was unsatisfactory and the seawater degradability was also unsatisfactory.

REFERENCE SIGNS LIST

10 spoon

11 bowl

12 handle

The invention claimed is:

1. A resin composition for injection molding, comprising a poly(3-hydroxyalkanoate) resin component, wherein the poly(3-hydroxyalkanoate) resin component comprises:

a copolymer (A) which is a copolymer of 3-hydroxybutyrate units and other hydroxyalkanoate units, wherein a content of the other hydroxyalkanoate units in the copolymer (A) is from 1 mol % to 6 mol %; and a copolymer (B) which is a copolymer of 3-hydroxybutyrate units and other hydroxyalkanoate units, wherein a content of the other hydroxyalkanoate units in the copolymer (B) is from 24 mol % to 30 mol %, the resin composition further comprises a layered clay mineral (C), in the poly(3-hydroxyalkanoate) resin component, a proportion of the copolymer (A) is from 72 wt % to 93 wt %, and a proportion of the copolymer (B) is from 7 wt % to 28 wt %, an amount of the layered clay mineral (C) is from 5 to 45 parts by weight per 100 parts by weight of the total poly(3-hydroxyalkanoate) resin component, and the other hydroxyalkanoate units in the copolymer (B) are 3-hydroxyhexanoate units.

2. The resin composition for injection molding according to claim 1, wherein an average content of the other hydroxyalkanoate units in total monomer units constituting the poly(3-hydroxyalkanoate) resin component is from 2 to 35 mol %.

3. The resin composition for injection molding according to claim 1, wherein the other hydroxyalkanoate units in the copolymer (A) are 3-hydroxyhexanoate units.

4. The resin composition for injection molding according to claim 1, wherein the layered clay mineral (C) comprises at least one selected from the group consisting of mica, talc, and kaolinite.

5. An injection-molded article comprising the resin composition for injection molding according to claim 1.

6. The resin composition for injection molding according to claim 1, wherein the content of the other hydroxyalkanoate units in the copolymer (A) is from 2 mol % to 5 mol %.

7. The resin composition for injection molding according to claim 1, wherein the proportion of the copolymer (A) is from 75 wt % to 90 wt %, and the proportion of the copolymer (B) is from 10 wt % to 25 wt %.

8. The resin composition for injection molding according to claim 1, wherein the proportion of the copolymer (A) is from 77 wt % to 88 wt %, and the proportion of the copolymer (B) is from 12 wt % to 23 wt %.

9. The resin composition for injection molding according to claim 1, wherein an average content ratio of 3-hydroxybutyrate units and other hydroxyalkanoate units, 3-hydroxybutyrate units/other hydroxyalkanoate units, in total monomer units constituting the poly(3-hydroxyalkanoate) resin component is from 98/2 to 65/35 mol %/mol %.

10. The resin composition for injection molding according to claim 1, wherein an average content ratio of 3-hydroxybutyrate units and other hydroxyalkanoate units, 3-hydroxybutyrate units/other hydroxyalkanoate units, in total monomer units constituting the poly(3-hydroxyalkanoate) resin component is from 96/4 to 75/25 mol %/mol %.

11. The resin composition for injection molding according to claim 1, wherein a weight-average molecular weight of the poly(3-hydroxyalkanoate) resin component is from $5\times10^4$ to $300\times10^4$.

12. The resin composition for injection molding according to claim 1, wherein a weight-average molecular weight of the poly(3-hydroxyalkanoate) resin component is from $20\times10^4$ to $200\times10^4$.

13. The resin composition for injection molding according to claim 1, wherein an average particle size of the layered clay mineral (C) is from 0.1 μm to 50 μm.

14. The resin composition for injection molding according to claim 1, wherein an average particle size of the layered clay mineral (C) is from 0.3 μm to 30 μm.

15. The resin composition for injection molding according to claim 1, wherein the amount of the layered clay mineral (C) is from 10 to 40 parts by weight per 100 parts by weight of the total poly(3-hydroxyalkanoate) resin component.

16. The resin composition for injection molding according to claim 1, wherein the amount of the layered clay mineral (C) is from 10 to 35 parts by weight per 100 parts by weight of the total poly(3-hydroxyalkanoate) resin component.

17. The resin composition for injection molding according to claim 1, further comprising from 0.1 to 20 parts by weight of at least one dispersion aid per 100 parts by weight of the total poly(3-hydroxyalkanoate) resin component.

18. The resin composition for injection molding according to claim 1, further comprising from 0.1 to 5 parts by weight of a nucleating agent per 100 parts by weight of the total poly(3-hydroxyalkanoate) resin component.

19. The resin composition for injection molding according to claim 1, wherein the proportion of the copolymer (A) is from 80 wt % to 93 wt %, and the proportion of the copolymer (B) is from 7 wt % to 20 wt %.

20. The resin composition for injection molding according to claim 1, wherein the amount of the layered clay mineral (C) is from 5 to 30 parts by weight per 100 parts by weight of the total poly(3-hydroxyalkanoate) resin component.

21. The resin composition for injection molding according to claim 1, wherein the proportion of the copolymer (A) is from 75 wt % to 90 wt %, and the proportion of the copolymer (B) is from 10 wt % to 25 wt %, and the amount of the layered clay mineral (C) is from 10 to 40 parts by weight per 100 parts by weight of the total poly(3-hydroxyalkanoate) resin component.

* * * * *